INVENTOR
CHITOOR V. SRINIVASAN
BY [signature]
ATTORNEY

INVENTOR
CHITOOR V. SRINIVASAN
BY [signature]
ATTORNEY

INVENTOR
CHITOOR V. SRINIVASAN
BY Samuel Cohen
ATTORNEY

INVENTOR
CHITOOR V. SRINIVASAN
BY [signature]
ATTORNEY

United States Patent Office 3,562,709
Patented Feb. 9, 1971

3,562,709
CORRECTION OF BLOCK ERRORS IN TRANSMISSION OF DATA

Chitoor V. Srinivasan, Princeton, N.J., assignor to RCA Corporation, a corporation of Delaware
Filed Sept. 12, 1968, Ser. No. 759,363
Int. Cl. G08c *25/00;* G06f *11/12*
U.S. Cl. 340—146.1 6 Claims

ABSTRACT OF THE DISCLOSURE

Information bits are arranged in subsets according to certain rules and a check bit is generated for each subset. The bits are transmitted in blocks, each block consisting of information bits chosen from different subsets and a check bit. At the receiving end of the system, a "syndrome" is generated which indicates whether any errors have occurred and if so the bits which are in error. The type of symmetry exhibited by the syndrome indicates which block has one or more errors and in response to this information and to particular syndrome bits the errors automatically are corrected.

BACKGROUND OF THE INVENTION

Copending application Ser. No. 521,910 for System for Automatic Correction of Burst-Errors, filed Jan. 20, 1966 by the present inventor and now Pat. No. 3,478,-313, describes a burst error correction system. In this system, all errors in a group of up to $b$ adjacent bits in a relatively long string of bits are detected and automatically corrected. The burst error can occur anywhere in the string and can even extend from some of the end bits through some of the beginning bits of a string.

In many applications today, there is a different problem to be solved. The bits are transmitted in blocks as, for example, in bytes eight bits in length. Each byte may, for example, be transmitted to a different module of the memory of a data processing machine. Here, if for some reason such as the failure of a power supply one module of the memory becomes defective, the byte transmitted to that module is lost. In this environment, it is usually unlikely that errors will occur in more than one byte but when errors do occur, from one to all of the bits of the one byte may have to be corrected.

An object of the present invention is to provide a new and improved system which is particularly suited for correcting block errors.

Another object of the invention is to provide a system of this type in which a relatively small number of check digits is needed for a relatively large number of information digits and in which all errors in a block can be corrected.

SUMMARY OF THE INVENTION

In the system of the invention, information bits $x_1, x_2 \ldots x_{N-k}$ are arranged into $k$ subsets such that each information bit appears only once in a subset, each information bit is included in two subsets and no two subsets contain the same pair of bits. A check bit is produced for each subset of information bits. Bits are then transmitted in $k$ blocks, each block consisting of a group of information bits and a single check bit which is not associated with any formation bit in its block. A syndrome Z is generated in response to the receipt of the blocks of bits, which syndrome has bits all of the same value when there is no error in the received bits and which, in other cases, has a distinctive patterns of 0's and 1's whose symmetry is indicative of whether there is one or more errors in only a single block of the $k$ blocks of bits. Means responsive to the syndrome produces an output D indicative of the type of symmetry exhibited by the syndrome. Means responsive to the output D, to the syndrome Z and to the received blocks of bits produces bits $$\tilde{x}_1, \tilde{x}_2 \ldots \tilde{x}_{N-k}$$

which are of the same value as the corresponding transmitted bits $x_1, x_2 \ldots x_{N-k}$.

DETAILED DESCRIPTION

In the discussion below, a string of symbols received from or transmitted through a data transmisison or storage channel (hereinafter referred to as a channel) is called a word. A transmitted word is represented by:

$$W = w_1 w_2 \ldots w_N \quad (1)$$

where $w_i$ for $1 \leq i \leq N$ are the individual symbols of the word. In binary systems, each symbol $w_i$ represents a binary digit (bit). Its corresponding received word is represented by:

$$\hat{W} = \hat{w}_1 \hat{w}_2 \ldots \hat{w}_N \quad (2)$$

Figure 1:
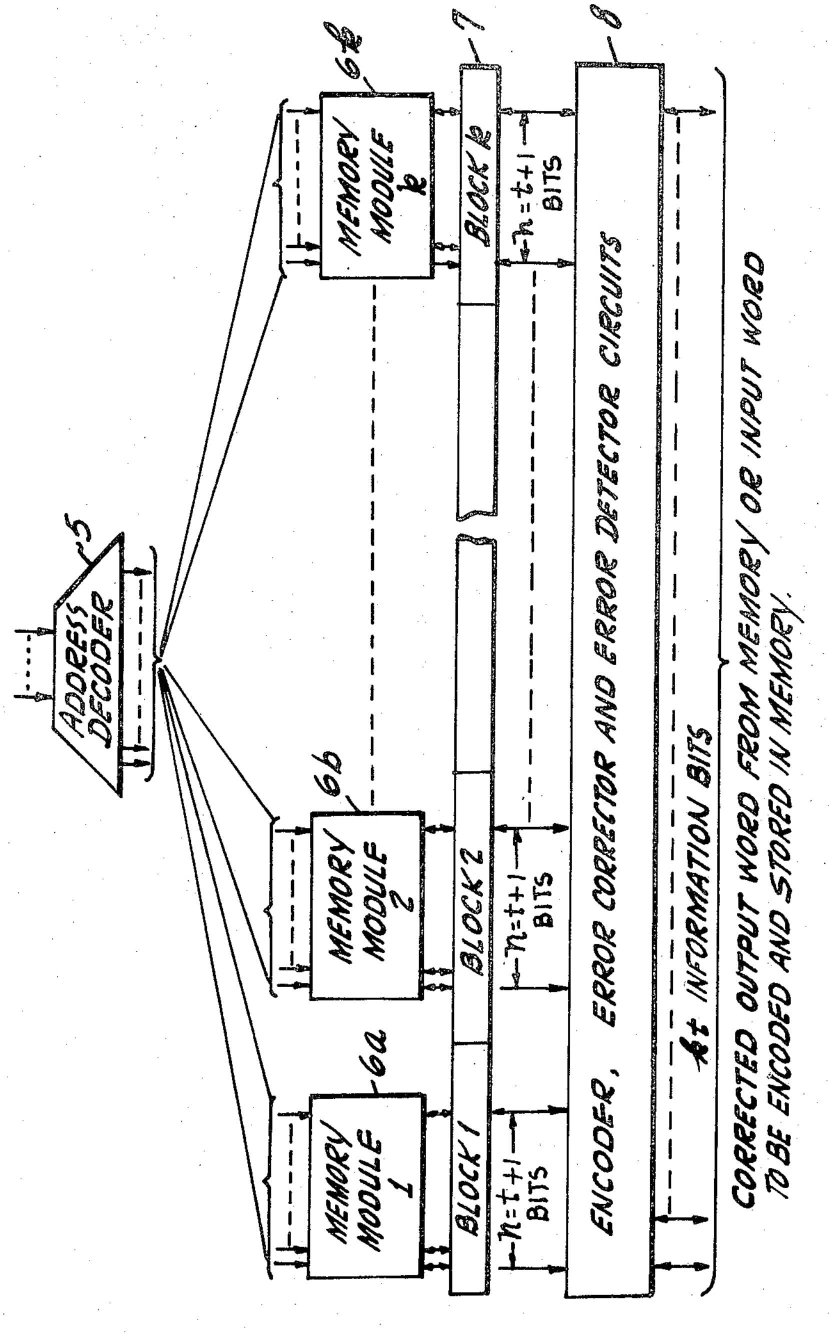
FIG. 1 is a block diagram of one form of system in which the present invention is useful.
Figure 2:
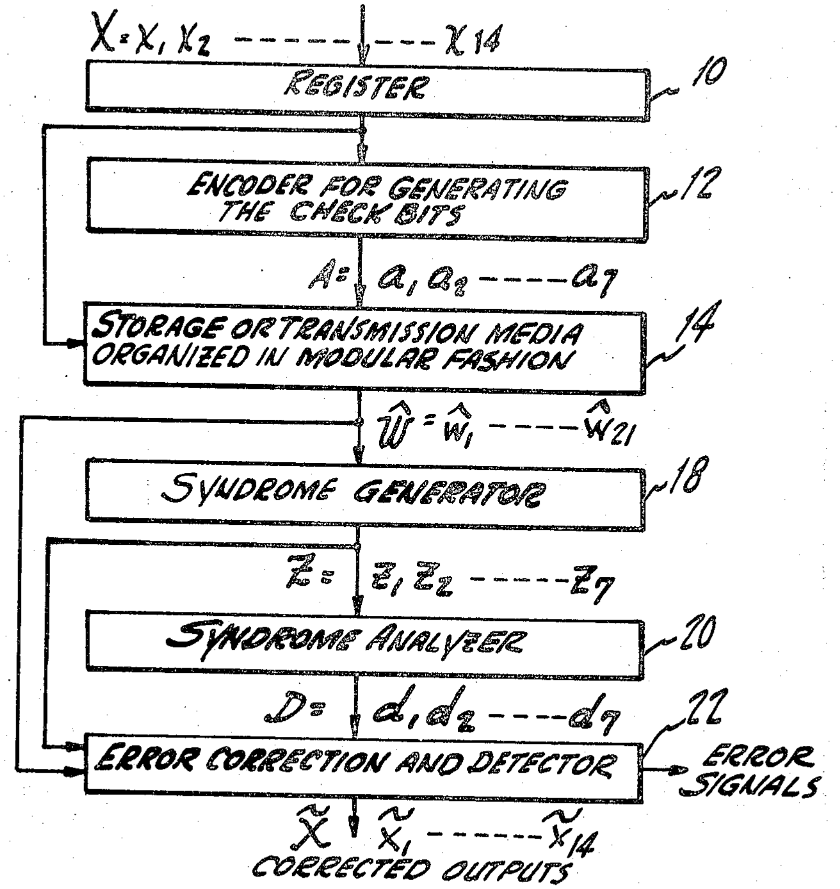
FIG. 2 is a block diagram showing the major components of the error detection and correction system of the invention.

In a memory system with a modular organization, a word W may consist of $k$ blocks and each block may have a number of bits. In FIG. 1, the address decoder 5 transmits to the $k$ memory modules **6*a*, 6*b* . . . 6*k* these $k$ blocks of bits. From the memory modules the $k$ blocks of bits, illustrated schematically by elongated rectangle 7, are applied to the system of FIG. 2 shown as a single rectangle 8** in FIG. 1. In the case of a communication system, the grouping of the symbols into blocks takes place at the transmission end of the system.

In the present discussion the number of symbols present in any one block of a word is denoted by $n$. The total number of symbols in a word therefore is:

$$N = kn \quad (3)$$

A received word $\hat{W}$ is said to have an error if $$\hat{W} \neq W$$

i.e., some or all of the symbols in $\hat{W}$ are not the same as their corresponding symbols in W. $\hat{W}$ is said to have a *single block error* if all the symbols of $\hat{W}$ which differ from their corresponding symbols in W are confined to a single block of the word. The discussion below deals with the correction of all such possible single block errors in a received word, and also with the detection of several of the other possible errors which do not satisfy the single block error condition.

In the embodiment of the invention discussed by way of example herein, the words consist of binary digits 0 or 1, and the encoding and decoding circuits use only binary valued logic. These circuits include gates to which electrical signals indicative of binary digits (bits) are applied and which produce electrical signals again indicative of bits only. To simplify the discussion which follows, rather than speaking of the signals which manifest the bits, the bits themselves are referred to and are represented by symbols. It is to be understood, however, that the coding schemes discussed are also applicable to more general cases where the symbols or the electrical signals manifesting the symbols may have more than just two possible values, provided that the total number of possible values is always less than some upper bound, say $b$. This upper bound is known as the *base* of the system. In the case of the binary valued systems $b=2$.

The system of the present invention is illustrated in FIG. 2. To make the explanation easier to follow, a specific example, namely a system for handling $n=3$ bits per block (2 information bits and one check bit) and consisting of $k=7$ blocks (a total of 14 information bits) is illustrated. However, this specific illustration is not to be taken as limiting the invention, as the concepts discussed herein are applicable to all situations where the number of blocks $k$ is a prime number. Other examples illustrating this fact are given later.

The system of FIG. 2 includes a register 10 for storing the 14 informaiton bits, $x_1$–$x_{14}$. These bits are applied to a circuit 12 for generating the check bits. As is discussed in more detail later, in the circuit 12 the information bits are subdivided into groups known as sub-sets S. In this particular case, there are $k=7$ subsets, and each subset has 4 bits. A check bit "$a$" is generated for each such subset. The rules defining how the bits for each subset are chosen are discussed later. For the case $k=7$, seven such check bits $a_1$–$a_7$ are generated.

The check bits from circuit 12 and the information bits from circuit 10 are applied to a circuit 14 which transmits these information and check bits, 21 in all, arranging them into blocks according to a certain rule which is explained later. In this example, the transmitted word consists of 7 blocks $B_1, B_2 \ldots B_7$, each block containing two information bits and one check bit, as shown in Table I.

TABLE I

Code word in the (k=7, N=21) example:

Codeword: $W=w_1w_2 \ldots w_{21}=B_1B_2B_3B_4B_5B_6B_7$

| $B_1$ | $B_2$ | $B_3$ | $B_4$ | $B_5$ | $B_6$ | $B_7$ |
|---|---|---|---|---|---|---|
| $x_1x_2a_4$ | $x_3x_4a_5$ | $x_5x_6a_6$ | $x_7x_8a_7$ | $x_9x_{10}a_1$ | $x_{11}x_{12}a_2$ | $x_{13}x_{14}a_3$ |

This word W is transmitted through the channel either serially, as in a communication system, or in parallel as in a memory system. As a third alternative, groups of bits in blocks $B_i$ may be transmitted in parallel, and the blocks themselves be transmitted serially.

The circuit 18 includes means for comparing the check bits and the information bits of the received word $\hat{W}$ in a certain way, as discussed in detail later, and for indicating, as a result of this comparison, whether or not there are any errors in $\hat{W}$. As a result of this comparison, the means 18 generates a "syndrome" Z which, in this example, is 7 bits long ($Z=z_1, z_2 \ldots z_7$). If $W=\hat{W}$, then Z consists of all 0's. If $$W \neq \hat{W}$$

and the error is detectable, then Z contains one or more ones and, as will be shown below, when the error is correctable, the position of these 1's is indicative of the bit or bits in W which are in error. It should be mentioned here, as an aside, that there need not be a one-to-one correspondence between the 1's in the syndrome and the bits in $\hat{W}$ which are in error.

The syndrome Z produced by the means 18 is applied to the means 20. The latter indicates whether or not there is an error and, if the error is correctable, the particular block which is in error. As will be explained in more detail later, all of this is deduced by detection of the type of symmetry exhibited by the pattern of bits of the syndrome.

The particular system illustrated in FIG. 2 is capable of correcting all single block errors, where each block is of length 3. It can be shown that for $k=7$ and $N-k=14$ information bits there are 49 such single block errors which are possible and there are 49 different syndromes Z, each for identifying a different error, which may be applied to the means 20. In response to the syndrome Z, the means 20 generates an output word $D=d_1 \ldots d_7$ in which, if there is only a single block error in $\hat{W}$ and it is in the $i^{th}$ block, then $d_i=1$, where $1 \leq i \leq 7$.

The words D, Z and $\hat{W}$ are applied to the error correcting circuit 22. This circuit may include one or a group of modulo 2 adders. It produces a corrected word as its output, which is equal to W if the error in $\hat{W}$ is a single block error. If the error is not a single block error, but is one of the detectable errors, circuit 22 produces a signal for indicating the presence of an uncorrectable error.

CHECK BIT GENERATION

As mentioned above, the information bits are grouped in $k$ subsets $S_1 \ldots S_k$ and a check bit is generated for each such subset, where $k$ is the number of blocks in a word. The subsets $S_1 \ldots S_k$ are rows in a matrix [V] having $k$ columns and $k$ rows. The matrix itself is an arrangement of the N-$k$ information bits ($x_1 \ldots x_{N-k}$) and zeros where:

$$N-k=k(k-3)/2 \tag{4}$$

The arrangement in the first column of [V] is;

$$V_1=\begin{bmatrix} x_1 \\ x_2 \\ \cdot \\ \cdot \\ \cdot \\ x_{(k-3)/2} \\ 0 \\ 0 \\ 0 \\ x_{(k-3)/2} \\ \cdot \\ \cdot \\ \cdot \\ x_2 \\ x_1 \end{bmatrix}$$

For $k=7$ the first volumn is as shown in Table II.

TABLE II $n=3,\ k=7,\ N=21$

| Column | 1 | 2 | 3 | 4 | 5 | 6 | 7 |
|---|---|---|---|---|---|---|---|
| $S_1=($ | $x_1$ | $x_3$ | $x_6$ | 0 | 0 | 0 | $x_{14})$ |
| $S_2=($ | $x_2$ | $x_3$ | $x_5$ | $x_8$ | 0 | 0 | 0 ) |
| $S_3=($ | 0 | $x_4$ | $x_5$ | $x_7$ | $x_{10}$ | 0 | 0 ) |
| $S_4=($ | 0 | 0 | $x_6$ | $x_7$ | $x_9$ | $x_{12}$ | 0 ) |
| $S_5=($ | 0 | 0 | 0 | $x_8$ | $x_9$ | $x_{11}$ | $x_{14})$ |
| $S_6=($ | $x_2$ | 0 | 0 | 0 | $x_{10}$ | $x_{11}$ | $x_{13})$ |
| $S_7=($ | $x_1$ | $x_4$ | 0 | 0 | 0 | $x_{12}$ | $x_{13})$ |

The explanation of the arrangement of the other columns requires an understanding of the concept of cyclic shifting, which is discussed below:

CYCLIC DOWN SHIFT OF A COLUMN

The cyclic down shift by one position of the first column of Table II is:

$$\begin{bmatrix} x_1 \\ \hdashline x_1 \\ x_2 \\ 0 \\ 0 \\ 0 \\ x_2 \end{bmatrix}$$

This is obtained by shifting down through one position each symbol in the column and carrying the bottom most symbol, in this case $x_1$, to the top. A cyclic down shift by $i$ positions is similarly achieved by shifting the first $(k-i)$ symbols down through $i$ positions and carrying the last $i$ symbols to the top of the column. A cyclic down shift of the first column of Table II through 4 positions is given below as an additional illustration of the point:

$$\begin{bmatrix} 0 \\ 0 \\ x_2 \\ x_1 \\ \hdashline x_1 \\ x_2 \\ 0 \end{bmatrix}$$

The arrangement of information digits and zeros in other columns of [V] is illustrated next. The $i^{th}$ column of [V], say $V_i$, for $2 \leq i \leq k$ is obtained by first constructing the column shown below, where: $t=(k-3)/2$.

$$\begin{bmatrix} x_{(i-1)t+1} \\ x_{(i-1)t+2} \\ \cdot \\ \cdot \\ \cdot \\ x_{i.t} \\ 0 \\ 0 \\ 0 \\ x_{i.t} \\ \cdot \\ \cdot \\ \cdot \\ x_{(i-1)t+2} \\ x_{(i-1)t+1} \end{bmatrix}$$

and then shifting this column down cyclically through $(i-1)$ positions. Thus the fourth column of Table I is obtained by shifting down the arangement, $$\begin{bmatrix} x_7 \\ x_8 \\ 0 \\ 0 \\ 0 \\ x_8 \\ x_7 \end{bmatrix}$$

cyclically through $4-1=3$ positions, obtaining $$V_4=\begin{bmatrix} 0 \\ x_8 \\ x_7 \\ x_7 \\ x_8 \\ 0 \\ 0 \end{bmatrix}$$

since, in this case $i=4$, $k=7$, $t=(k-3)/2=2$ $$x_{(i-1)t+2}=x_7$$

and $x_{(i-1)t+2}=x_8$.

Inspection of the Table II reveals certain properties in the subsets $S_1 \ldots S_7$. They are:

Property 1: A particular information bit appears only once in a subset.

Property 2: Each information bit appears in exactly two different subsets.

Property 3: No two subsets of information bits have more than one particular bit in common. This means that if a pair of information bits $x_i$ and $x_j$ appear together in one subset, then other subset includes both these information bits. One other subset can and does include $x_j$; a third subset can and does include $x_i$.

Property 4: An important restriction which all these codes should satisfy is that the number $k$ should be a prime number, that is, $k$ should not be divisible by any number $i$ within the range $2 \leq i \leq (k-1)$. The reason for this restriction will become clear later.

The $j^{th}$ check bit $a_j$ for $1 \leq j \leq k$ is simply the even parity bit for the $j^{th}$ subset of $S_j$. In other words, $a_j$ is the modulo 2 sum of the information bits in the subject $S_j$ written as below:

$$a_j=\left\{x_i \sum_{\epsilon}^{2} S_j\right\} x_i \text{ for } j=1, 2 \ldots k \quad (5)$$

where $\{x_i \epsilon S_j\}$ is read for all $x_i$ included in $S_j$, and $$\sum^{2}$$

is the modulo 2 sum, $a_j=0$ if $S_j$ has an even number of 1's and $a_j=1$ in all other cases. To illustrate, for subset $S_1$ of Table II $$a_1=x_1 \oplus x_3 \oplus x_6 \oplus x_{14}$$

for subset $$S_2, a_2=x_2 \oplus x_3 \oplus x_5 \oplus x_8$$

and so on, where $\oplus$ represents modulo 2 addition.

In general, for a non-binary system with base $b>2$, $a_j$ is the modulo $b$ sum of the information digits in $S_j$, written as $$a_j=\left\{x_i \sum_{\epsilon}^{b} S_j\right\} x_i \text{ for } j=1,2 \ldots k \quad (6)$$

where $$\sum^{b}$$

is the modulo $b$ sum. Since in the present application the examples given are binary systems, the symbol $\Sigma$ is hereafter employed to denote $$\sum^{2}$$

From the properties above it may be concluded that each information bit is associated with 2 different check bits.

Figures 3, 4:
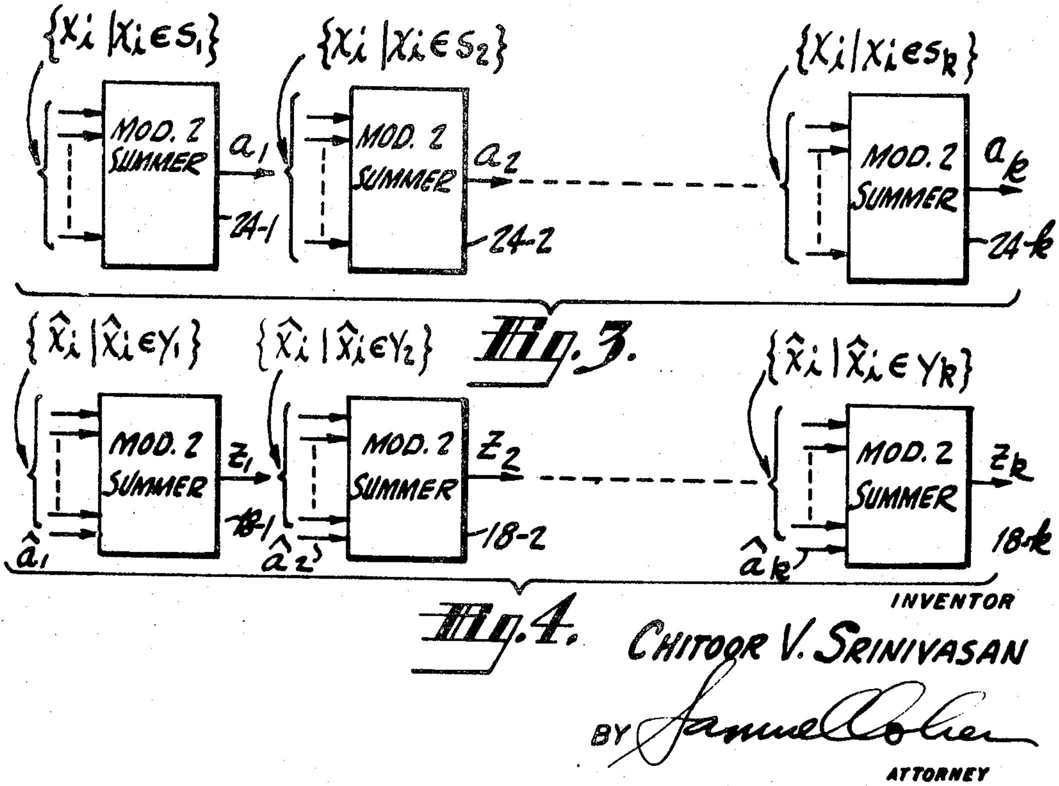
FIG. 3 is an embodiment of an encoder, that is, a circuit for generating check bits, which may be used in the system of FIG. 2.
FIG. 4 is a block diagram of a form of syndrome generator which may be used in the system of FIG. 2.

FIG. 3 is a block diagram of the circuit for generating the check bits $a_1 \ldots a_k$. Each subset of information bits (each such subset is a different row of the matrix [V] of Table II) is applied to a parity generator circuit 24 which generates the parity bit. Parity bit $a_j$ for $1 \leq j \leq k$ is generated from the subset $S_j$. There may be one such circuit 24 for each parity bit $a_1 \ldots a_k$, as shown, and in this case all parity bits are generated simultaneously (in parallel). As an alternative, there may be only a single parity circuit for all subsets to which the subsets $S_1 \ldots S_k$ are applied in succession and which generates the check bits $a_1 \ldots a_k$ also in succession. The parity bit $a_j$ is a zero if there are an even number of 1's in the subset $S_j$; otherwise $a_j$ is 1.

TRANSMISSION CIRCUIT 14

The transmission circuit 14 of FIG. 2 forms the various blocks of a code word from the information bits $x_1 \ldots x_{14}$ and the checks bits $a_1 \ldots a_7$. Each block of the code word corresponds to the bits of a column of Table II as follows:

The information bits in block $i$, for $1 \leq i \leq k$ are the same as those in the $i^{th}$ column of Table II. As mentioned earlier each column of Table II has three zeroes. Let $m$ be the row position of the center zero of the three zeroes in the $i^{th}$ column. For example, in the case of column 2 of Table II $m=5$, in column 1, $m=4$ and so on. This value of $m$ determines the check bit $a_m$ that goes with the $i$th block of the code word. For any $k$ and $i$, $1 \leq i \leq k$ the $i^{th}$ block of the core word is thus:

$$(x_{(i-1)t}x_{(i-1)t+1} \ldots x_{it}a_m)$$

where:

$k$ is the number of subsets $t=(k-3)/2$ $m=(k-1)/2+i$ for $1 \leq i \leq (k+1)/2$ $m=i-(k+1)/2$ for $(k+)3/2 \leq i \leq k$ (7)

Thus for $k=7$ the corresponding values of $m$ and $i$ are $$i=1\ 2\ 3\ 4\ 5\ 6\ 7$$

$$m=4\ 5\ 6\ 7\ 1\ 2\ 3$$

giving rise to the block structure of the code shown in Table I.

SYNDROME GENERATION

FIG. 4 shows the circuits 18–1 . . . 18–$k$ for generating the syndrome $Z=z_1z_2 \ldots z_k$. The various syndrome bits may be derived from the rows of Table III; Table III is obtained from Table II as follows.

In every column of Table II, the check bit $a_m$ is inserted at the $m^{th}$ row position of the column, where $m$ for the $i^{th}$ column is given by the rule (7) above. In the new table of information and check bit symbols obtained in this way, each symbol is modified by putting the hat mark $\wedge$, on top of each symbol. Thus for the 3rd column of Table II, the check bit $a_6$ is inserted at the 6th row position of the column, and a $\wedge$ mark is put on top of the symbols $x_5$, $x_6$ and $a_6$ to obtain the 3rd column of Table III. The rows of Table III define the new class of subsets $Y_1, Y_2 \ldots Y_k$.

Table III. Syndrome Matrix for ($k=7$, N=21) code

| Column | 1 | 2 | 3 | 4 | 5 | 6 | 7 |
|---|---|---|---|---|---|---|---|
| $Y_1=($ | $\hat{x}_1$ | $\hat{x}_3$ | $\hat{x}_6$ | 0 | $\hat{a}_1$ | 0 | $\hat{x}_{14})$ |
| $Y_2=($ | $\hat{x}_2$ | $\hat{x}_3$ | $\hat{x}_5$ | $\hat{x}_8$ | 0 | $\hat{a}_2$ | $0)$ |
| $Y_3=($ | 0 | $\hat{x}_4$ | $\hat{x}_5$ | $\hat{x}_7$ | $\hat{x}_{10}$ | 0 | $\hat{a}_3)$ |
| $Y_4=($ | $\hat{a}_4$ | 0 | $\hat{x}_6$ | $\hat{x}_7$ | $\hat{x}_9$ | $\hat{x}_{12}$ | $0)$ |
| $Y_5=($ | 0 | $\hat{a}_5$ | 0 | $\hat{x}_8$ | $\hat{x}_9$ | $\hat{x}_{11}$ | $\hat{x}_{14})$ |
| $Y_6=($ | $\hat{x}_2$ | 0 | $\hat{a}_6$ | 0 | $\hat{x}_{10}$ | $\hat{x}_{11}$ | $\hat{x}_{13})$ |
| $Y_7=($ | $\hat{x}_1$ | $\hat{x}_4$ | 0 | $\hat{a}_7$ | 0 | $\hat{x}_{12}$ | $\hat{x}_{13})$ |

Now, for $1 \leq i \leq k$ the snydrome bit $z_i$ is defined by the equation:

$$z_i=\left\{\hat{x}_j \sum_{\epsilon} Y_i\right\}\hat{x}_j \oplus \hat{a}_i \quad (8)$$

where $\Sigma$ and $\oplus$ denote modulo 2 summation. In other words $z_i$ is the modulo 2 sum of all of the $\hat{x}$ bits and the $\hat{a}$ bit within the subset $Y_1$. For example $$z_2=\hat{x}_2 \oplus \hat{x}_3 \oplus \hat{x}_5 \oplus \hat{x}_8 \oplus \hat{a}_2$$

Thus for each syndrome bit the circuit generating it is again a parity circuit producing for $z_i$ the value 0 when $Y_i$ has an even number of 1's, and the value 1 in other cases. It may be noticed that $$Y_i=\hat{S}_i \hat{\cup} a_i \quad (9)$$

where $\hat{S}_i$ denotes the set $S_i$ with a hat mark on each of its symbols, and $\hat{\cup}$ denotes the set union. Now, when $\hat{W}=W$, $\hat{x}_j=x_j$ for all $j$, and so also $\hat{a}_i=a_i$. In that case, Equation 8 may be rewritten substituting for $\hat{a}_i=a_i$ from Equation 5, and replacing all $\hat{x}_j$ by $x_j$ $$z_i=\left\{x_j \sum_{\epsilon} S_i\right\}x_j \oplus \left\{x_j \sum_{\epsilon} S_i\right\}x_j=0 \quad (10)$$

Thus, when $\hat{W}$ has no errors, $z_i=0$ for all $i$, $1 \leq i \leq k$. What is more, the syndrome bit $z_i=1$ if and only if there is an odd number of members of $Y_i$ in error.

From Equation 9 it is clear that the check bit generator circuits themselves may be employed to compute a part of each syndrome bit—that part consisting of the summation of the symbols in $\hat{S}_i$, and the symbol $\hat{a}_i$ may be added to their respective outputs. The check bits $z_1 \ldots z_k$ may all be generated in parallel by using $k$ identical generator circuits 18–1, 18–2 . . . 18–$k$ as shown in FIG. 4, or they may be generated in series by successively applying to the inputs of one such circuit the appropriate subsets $Y_j$ for $j=1, 2 \ldots k$, in sequence.

As mentioned before, in the present system it is of interest only to correct single block errors in $\hat{W}$. It is clear that each subset $Y_i$ of Table III, for $1 \leq i \leq k$, has at most only one digit from a block, since the digits of a block are precisely those in a column of Table III and no two columns of Table III have any digits in common (other than zeros), and the subsets $Y_i$ are themselves the rows of Table III. Thus, any single block error will cause at most only one digit per subset $Y_i$ to be in error. Since the syndrome bit $z_i$ is the modulo 2 sum of the bits in subset $Y_i$, when there is a single digit error in a bit of $Y_i$, the bit $z_i$ will be 1.

For example, in the code word shown in Table I, suppose the block $B_1$ is in error and none of the other blocks have any errors. The digits in the first block $\hat{B}_1$ are $$\hat{x}_1\hat{x}_2\hat{a}_4$$

in the received code word $\hat{W}$, and these digits are in the first column of Table III. None of the errors in block $B_1$ could cause erroneous digits to exist in subsets $Y_3$ and $Y_5$ shown in Table III. Thus $z_3$ and $z_5$ will always be zeros when errors are in $B_1$ only. Among the remaining syndrome bits, the values of $z_1=z_7$ will depend upon whether $\hat{x}_1$ is in error, or not, $z_2=z_6$ will depend upon whether $\hat{x}_2$ is in error or not and $z_4$ will depend upon the error in $\hat{a}_4$. This is because as may be seen in Table III, $Y_1$ and $Y_7$ contain $\hat{x}_1$, $Y_2$ and $Y_6$ contain $\hat{x}_2$ and $Y_4$ contains $\hat{a}_4$ and these are the only bits that can be in error if the single block error in $\hat{W}$ is in block $B_1$. Thus an error in an information bit within a block will be manifested in the syndrome as a pair of syndome bits of value 1, whereas an error in the check bit in a block will be manifested as a single syndrome bit of value 1.

Let $$e_1^1,\ e_2^1$$

and $$e_{.}^1$$

be the errors in the first block, $$e_{.}^1=1$$

for $i=1, 2, 3$ if the $i^{th}$ digit in the block is in error. Then:

$$\hat{x}_1 = x_1 \oplus e_1^1$$
$$\hat{x}_2 = x_2 \oplus e_2^1$$
$$\hat{a}_4 = a_4 \oplus e_3^1 \qquad (11)$$

Thus, if $$e_2^2 = 1$$

then $\hat{x}_2$ will be the complement of $x_2$, and similarly with the other digits in block 1. With this definition of $\hat{x}_1$, $\hat{x}_2$ and $\hat{a}_4$ it can be shown that the syndrome bits will have the values:

$$Z = z_1 \ldots z_7 = (e_1^1 e_2^1 0 e_3^1 0 e_2^1 e_1^1) = E^1 \qquad (12)$$

for a single block error in $B_1$. For example, if only $\hat{x}_1$ is in error, $$e_1^1 = 1$$

and $Z=E^1=1\ 0\ 0\ 0\ 0\ 0\ 1$; if $\hat{x}_1$ and $\hat{x}_2$ are both in error, $Z=E^1=1\ 1\ 0\ 0\ 0\ 1\ 1$ and so on.

The value of $z_1$, may be computed as follows. As $z_1$ corresponds to an error which is only in $B_1$, $\hat{a}_1=a_1$ and $\hat{x}_3=x_3$, $\hat{x}_6=x_6$ and $\hat{x}_{14}=x_{14}$. Hence, from Equation 5 and Table II $$\hat{a}_1 = a_1 = x_1 \oplus x_3 \oplus x_6 \oplus x_{14}$$

If this expression is substituted for $\hat{a}_1$ in Equation 8 and as $x_3=x_3$, $\hat{x}_6=x_6$ and $\hat{x}_{14}=x_{14}$ there is obtained:

$$z_1 = \hat{x}_1 \oplus x_3 \oplus x_6 \oplus x_{14} \oplus x_1 \oplus x_3 \oplus x_6 \oplus x_{14} \qquad (13)$$

In (13), $$x_1 \oplus e_1^1$$

may be substituted for $x_1$ (see Equation 11) to obtain:

$$z_1 = e_1^1 \oplus x_1 \oplus x_3 \oplus x_6 \oplus x_{14} \oplus x_1 \oplus x_3 \oplus x_6 \oplus x_{14}$$

As the modulo 2 sum of $$[x_1 \oplus x_3 \oplus x_6 \oplus x_{14}] \oplus [x_1 \oplus x_3 \oplus x_6 \oplus x_{14}] = 0,\ z_1 = e_1^1$$

The other syndrome bits may be similarly seen to be as shown in Equation 12. Similarly, if the errors are in $B_2$ only and these errors are denoted by $$(e_1^2,\ e_2^2,\ e_3^2)$$

then $$Z = E^2 = (e_1^2 e_1^2 e_2^2 0 e_3^2 0 e_2^2 \qquad (14)$$

For example, if only $\hat{x}_3$ is in error, $$e_1^2 = 1 \text{ and } Z = E^2 = 1\ 1\ 0\ 0\ 0\ 0\ 0$$

if only $\hat{x}_4$ is in error, $$e_1^2 = 1 \text{ and } Z = E^2 = 1\ 1\ 0\ 0\ 0\ 0\ 0$$

and so on.

The pattern in $E^2$ is obtained by shifting $E^1$ to the right cyclically by one digit position. This may be symbolically expressed as:

$$E^2 = R_1(E^1) \qquad (15)$$

where $R_1(E^1)$ denotes a cyclic right shift of $E^1$ with the superscript 1 of $E^1$ changed to $(1+1)$ to obtain $E^2$.

In general, if there is a single block error in block $B_j$, $2 \leq j \leq k$ then $$Z = E^j = R_{j-1}(E^1) \qquad (16)$$

where $R_{j-1}(E^1)$ denotes a cyclic right shift through $(j-1)$ digits of $E^1$ with the superscript changed to $(1+j-1)$ to obtain $E^j$. This property of $E^1, E^2 \ldots E^j$ arises directly because of the fact that the columns of Table III themselves have patterns which are cyclic shifts of each other.

$E^1$ is symmetrical; in the case of $E^2$ the symmetry is shifted right by one digit position and in the case of $E^j$ by $(j-1)$ digit positions for $2 \leq j \leq k$. Thus by identifying the right shifts in the symmetry pattern the block containing the single block error also may be identified, provided that it is true that if $E^1 \neq Z$ $$R_j(E^1) \neq R_i(Z) \qquad (17)$$

for any $i$ and $j$, $1 \leq i \leq k-1$ and $1 \leq j \leq (k-1)$ (where $R_0$ denotes no cyclic shifts). This property can be shown to hold only when $k$ is a prime number.

SYNDROME ANALYZER MEANS

The purpose of the syndrome analyzer circuits is to determine the symmetry pattern exhibited by the syndrome. As discussed earlier, the symmetry pattern of the syndrome for a single block error in $B_1$ for the $k=7$ code is:

$$z_1 \ldots z_7 = (e_1^1 e_2^1 0 e_3^1 0 e_2^1 e_1^1)$$

For this symmetry pattern, clearly $$(z_1 \oplus z_7) \vee (z_2 \oplus z_6) \vee (z_3 \vee z_5) = 0$$

where $\vee$ is logical OR. Now, if $\bar{d}_1$ is defined as, $$\bar{d}_1 = (z_1 \oplus z_7) \vee (z_2 \oplus z_6) \vee (z_3 \vee z_5) \qquad (18)$$

where $\bar{d}_1$ denotes the complement of $d_1$, it follows that $d_1=1$ if and only if the symmetry pattern in $(z_1 \ldots z_7)$ is as shown above, or if $(z_1 \ldots z_7)$ is all zeros. Similarly for the symmetry pattern of Z corresponding to a single block error in $B_2$ namely, $$Z = z_1 \ldots z_7 = (e_1^2 e_1^2 e_2^2 0 e_3^2 0 e_2^2$$

$\bar{d}_2$ may be defined as $$\bar{d}_2 = (z_1 \oplus z_2) \vee (z_3 \oplus z_7) \vee (z_4 \vee z_6) \qquad (19)$$

where $d_2=1$ if and only if Z has the symmetry pattern for single block error in block $B_2$, or $Z=0$. Similar equations for the symmetry pattern digits $d_1$ through $d_7$ are shown in Equation 20. All seven equations have the same form. The only difference between them is in the distribution of the $z_i$'s.

$$\bar{d}_1 = (z_1 \oplus z_7) \vee (z_2 \oplus z_6) \vee (z_3 \vee z_5)$$
$$\bar{d}_2 = (z_2 \oplus z_1) \vee (z_3 \oplus z_7) \vee (z_4 \vee z_6)$$
$$\bar{d}_3 = (z_3 \oplus z_2) \vee (z_4 \oplus z_1) \vee (z_5 \vee z_7)$$
$$\bar{d}_4 = (z_4 \oplus z_3) \vee (z_5 \oplus z_2) \vee (z_6 \vee z_1)$$
$$\bar{d}_5 = (z_5 \oplus z_4) \vee (z_6 \oplus z_3) \vee (z_7 \vee z_2)$$
$$\bar{d}_6 = (z_6 \oplus z_5) \vee (z_7 \oplus z_4) \vee (z_1 \vee z_3)$$
$$\bar{d}_7 = (z_7 \oplus z_6) \vee (z_1 \oplus z_5) \vee (z_2 \vee z_4) \qquad (20)$$

Accordingly, the syndrome analyzer circuit for detecting single block errors in the various blocks are also identical in form. The circuit for the $k=7$ code is shown in FIG. 6*b*, where the inputs are marked $(g_1 g_2 g_3 g_5 g_6 g_7)$ (there is no $g_4$). In this circuit and in FIG. 6*a*, gates 51 are two input SUM MODULO 2 gates, that is, EXCLUSIVE/OR gates, gate 52 is a two input OR gate, gate 53 is a multiple input OR gate and gate 54 is a logical inverter. By suitably applying the bits $(z_1 \ldots z_7)$ to the $g$ terminals, the appropriate symmetry checking circuits for the different blocks are obtained. The correspondence between the $z_i$'s and the $g_i$'s for the various blocks is shown in Table IV. The relation between $d$ and the $g$'s is given by $$\bar{d} = (g_1 \oplus g_7) \vee (g_2 \oplus g_6) \vee (g_3 \vee g_5) \qquad (20a)$$

TABLE IV.

[Correspondence between $g_i$ and $z_i$ for $1 \leq i \leq 7$, for the $k=7$ case, for the various blocks.]

| | $B_1$ | $B_2$ | $B_3$ | $B_4$ | $B_5$ | $B_6$ | $B_7$ |
|---|---|---|---|---|---|---|---|
| $g_1$ | $z_1$ | $z_2$ | $z_3$ | $z_4$ | $z_5$ | $z_6$ | $z_7$ |
| $g_2$ | $z_2$ | $z_3$ | $z_4$ | $z_5$ | $z_6$ | $z_7$ | $z_1$ |
| $g_3$ | $z_3$ | $z_4$ | $z_5$ | $z_6$ | $z_7$ | $z_1$ | $z_2$ |
| $g_4$ | There is no $g_4$ | | | | | | |
| $g_5$ | $z_5$ | $z_6$ | $z_7$ | $z_1$ | $z_2$ | $z_3$ | $z_4$ |
| $g_6$ | $z_6$ | $z_7$ | $z_1$ | $z_2$ | $z_3$ | $z_4$ | $z_5$ |
| $g_7$ | $z_7$ | $z_1$ | $z_2$ | $z_3$ | $z_4$ | $z_5$ | $z_6$ |

In general, for any prime number $k$, $$\overline{d}=\bigvee_{j=1}^{t}(g_j \oplus g_{k-j+1}) \vee (g_{t+1} \vee g_{t+3}) \qquad (21)$$

where $t=(k-3)/2$ and the symbol $$\bigvee_{j=1}^{t}$$

means the CR function of all $(g_j \oplus g_{k-1+j})$ having values of $j$ ranging from 1 to $t$. To illustrate, in its expanded form Equation 21 becomes:

$$\overline{d}=(g_1 \oplus g_k)\vee(g_2 \oplus g_{k-1})\vee(g_3 \oplus g_{k-2})\vee$$

$$\vee(g_t \oplus g_{k-t+1})\vee(g_{t+1}\vee g_{t+3})$$

The general equation for $d_i$, $1\leq i\leq k$, in terms of the $z_j$'s is:

$$\overline{d}_i=\bigvee_{j=1}^{t}(z_{j+i-1}\oplus z_{k+i-j})\vee(z_{t+i}\vee z_{t+i+2}) \qquad (22)$$

where the index expressions $$(j+i-1),\ (k+i-j),\ (t+i),\ (t+i+2)$$

are computed according to the following rule:

Rule A: Whenever the arithmetic sum is greater than $k$, $k$ should be subtracted from the arithmetic sum.

This rule of summation is used to keep the indices always $\leq k$ for the given ranges of $i$ and $j$. The general correspondence between the $g_i$'s and the $z_i$'s for the $j^{th}$ block syndrome analyzer for $1\leq i\leq k$ and $1\leq j\leq k$ is:

$$g_i=z_{i+j-1} \qquad (23)$$

where the sum $(i+j-1)$ is again computed according to Rule A. The reader may verify that this rule produces the correspondence shown in Table IV.

Figure 5:
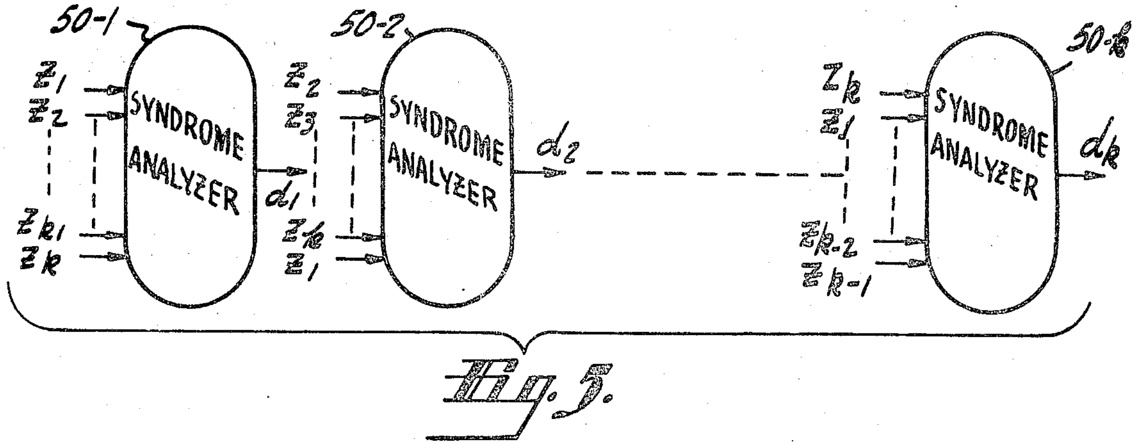
FIG. 5 is a block diagram of a group of syndrome analyzers which may be used in the system of FIG. 2.
Figure 6A:
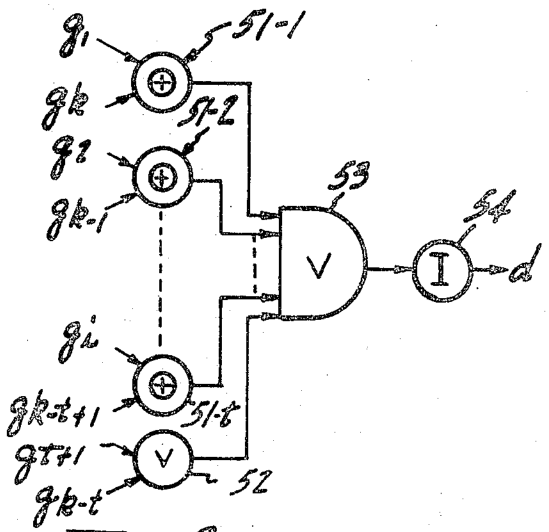
FIGS. 6*a* and 6*b* are logic diagrams showing details of a typical syndrome analyzer of FIG. 5.
Figure 6B:
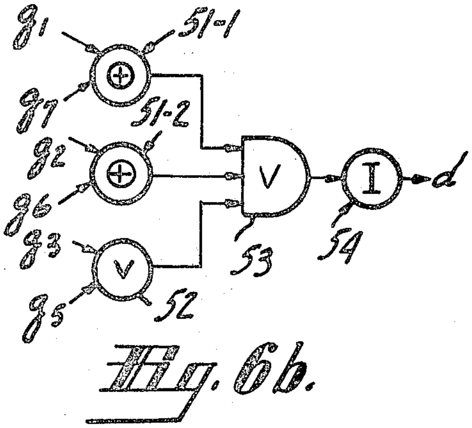

The general form of the analyzer circuit is shown in FIG. 6*a*. There may be $k$ such analyzers for performing the analysis for all the blocks simultaneously, or the analysis may be performed serially for each block by successively applying to a single analyzer circuit the suitably shifted versions of the syndrome. The legends at the input terminals of the blocks 50–1 . . . **50–*k*** in FIG. 5 show how the syndrome bits are shifted.

ERROR DETECTION MEANS

It can be shown that whenever the error is correctable, then exactly one of the $d_i$'s for $1\leq i\leq k$ is a 1. For example, when $\hat{x}_2$ is in error and no other received bit $\hat{x}_i$ is in error then $z_2=z_6=1$, and $d_1=1$, and $$d_2=d_3=d_4=d_5=d_6=d_7=0$$

(see Equation 20). It is also clear from Equation 20 that when there are no errors whatsoever, all the $d_i$'s equal 1. All other cases of distribution of 1's and 0's among the $d_i$'s can never occur, unless, of course, there is an error in one or more of the syndrome and analyzers. Thus, it is possible to detect the presence of errors in the error checking circuits. The logical equation for this error detection condition is obtained by observing that, whenever there is at least one non-zero $z_i$, for $1\leq i\leq k$, there should be no more than one 1 among the $d_i$'s.

Figure 7B:
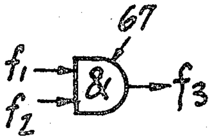
FIGS. 7*a* and 7*b* are logic diagrams of error detector circuits which may be employed in the system of FIG. 2.
Figure 7A:
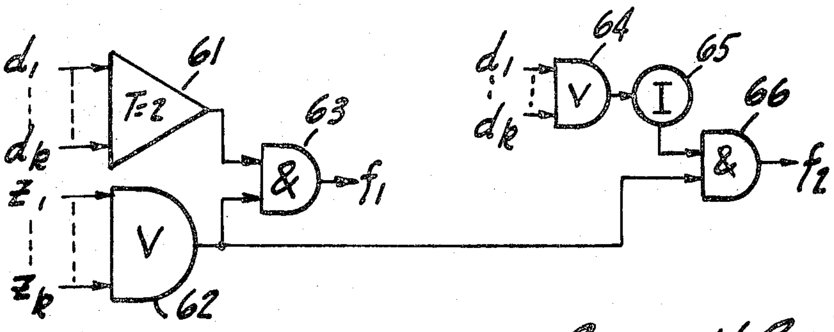

Thus, $f_1$ may be defined as $$f_1=T_2(d_1 \ldots d_k) \text{ and } (z_1\vee\ldots\vee z_k) \qquad (24)$$

where $T_2(d_1 \ldots d_k)$ is a threshold function whose value is 1 if and only if there are two or more 1's among the $d_i$'s. In other words, if at least one of the syndrome bits is a 1 and more than one of the $d$ bits is a 1, then $f_1=1$. Thus, $f_1=1$ implies that one or more of the syndrome analyzers is in error. The block diagram for computing this condition is shown in FIG. 7*a*. The circuit 61 is the threshold gate, 62 an OR-gate, and 63 an AND-gate.

The presence of uncorrectable errors in $\hat{W}$ also may be detected. Whenever there is an error which shows up by producing a non-zero $z_i$, if the error is uncorrectable then the syndrome will not satisfy the symmetry condition for any of the syndrome analyzers. Thus, all the $d_i$'s will be equal to 0. Thus, if $f_2$ is defined as $$f_2=\overline{(d_1\vee\ldots\vee d_k)} \text{ and } (z_1\vee\ldots\vee z_k) \qquad (25)$$

and $f_2=1$ then either an uncorrectable error has occurred, or else there is an error in the error checking circuitry, which $f_1$ could not detect. (An example of such an error is all the syndrome analyzers always producing a 0 output.) In the case of memory systems the above two cases may be distinguished by following the ad hoc rule given below.

If the error is in the error correction circuit then it is likely to produce $f_1=1$ or $f_2=1$ conditions for many of the words read out of the memory. Therefore, if $f_1=1$ or $f_2=2$ condition appears too often then one may suspect the error to be in the correction circuits. The computer associated with the memory may be used to check for such anomalous conditions.

The circuit for computing $f_2$ is shown in FIG. 7*a*. It comprises OR-gate 64, inverter 65 and AND-gate 66.

It should be emphasized that not all possible uncorrectable errors can be detected by $f_1$ and $f_2$. There are some error combinations which change one code word to another code word, or some multiple block errors which appear at the syndrome as single block errors. Such errors can neither be detected nor be properly corrected by the system.

It is clear from Equations 24 and 25 that $f_1$ and $f_2$ never simultaneously can be equal to 1. By setting up another condition, $$f_3=f_1 \text{ and } f_2 \qquad (26)$$

and sensing for the value $f_3=1$, errors in the circuits used for computing $f_1$ and $f_2$ may be detected. The circuit for computing $f_3$ is shown in FIGS. 7–3 and consists of a single AND gate 67.

ERROR CORRECTION MEANS

The next problem to be considered in the conditions under which a bit $\hat{x}_i$ such as $\hat{x}_1$ of the word $\hat{W}$, will have a *correctable* error. They are that:

(i) $\hat{W}$ has a single block error in block $B_1$, i.e., $d_1=1$ and
(ii) both $z_1$ and $z_7$ have values 1 (see Equation 12).

Thus, ($d_1$ and $z_7$)=1 indicates that $\hat{x}_1$ is in error and the error is correctable. To correct the error, it is necessary only to complement $\hat{x}_1$. Thus, the corrected bit $$\tilde{x}_1=\hat{x}_1\oplus(d_1 \text{ and } z_1)=\hat{x}_1\oplus(d_1 \text{ and } z_7)$$

Similarly $$\tilde{x}_2=\hat{x}_2\oplus(d_1 \text{ and } z_2)=x_2\oplus(d_1 \text{ and } z_6)$$

The syndrome bits $z_1$ and $z_7$ were chosen to correct the error in $\hat{x}_1$ because $\hat{x}_1$ occurs only in subsets $Y_1$ and $Y_7$ and for similar reason the syndrome bits $z_2$ and $z_6$ were chosen to correct $\hat{x}_2$.

Thus the error bits $$e_1^1$$

and $$e_2^1$$

are:

$$(d_1 \text{ and } z_1)=(d_1 \text{ and } z_7)=e_1^1$$

$$(d_1 \text{ and } z_2)=(d_1 \text{ and } z_6)=e_2^1 \qquad (27)$$

and the corrected bits $\tilde{x}_1$ and $\tilde{x}_2$ are:

$$\tilde{x}_1=\hat{x}_1\oplus e_1^1 \text{ and } \tilde{x}_2=\hat{x}_2\oplus e_2^1 \qquad (28)$$

The general equations for error correction in the $i^{th}$ digit of the $j^{th}$ block of $\hat{W}$ for $1\leq i\leq k$ is:

$$e_i^j=(d_j \text{ and } z_{(i+j-1)})=(d_j \text{ and } z_{k-i+j}) \qquad (29)$$

where the indicies are computed according to Rule A, and $$\tilde{x}_{(j-1)t+i}=\hat{x}_{(j-1)1t+i}\oplus e_i^j \quad (30)$$

where $\hat{x}_{(j-1)t+i}$ is the $i^{th}$ digit in the $j^{th}$ block of $\hat{W}$, and $t=(k-3)/2$.

Figures 8A, 8B:
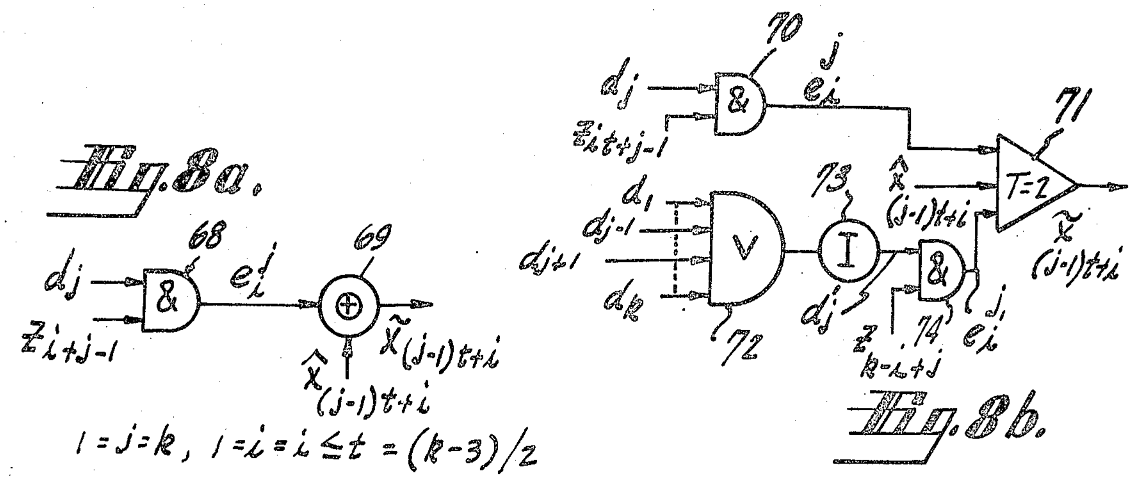
FIGS. 8*a* and 8*b* are logic diagrams of error correction circuits which may be employed in the circuit of FIG. 2.

The block circuit diagram for performing this error correction is shown in FIG. 8*a* and follows directly from Equations 29 and 30. The circuit includes an AND gate 68 to which the bits $d_j$ and $z_{i+j-1}$ are applied and an EXCLUSIVE/OR gate 69 connected to receive the output of the AND gate 68 and the bit $\hat{x}_{(j-1)t+i}$.

There is another way for performing the correction which provides some protection against errors in the logic gates. It makes use of the following principle:

For all single block errors only one $d_j$ for $1\leq j\leq k$ can be equal to 1. Hence, for all *correctable* errors $$d_j \rightleftharpoons \overline{(d_1\vee\ldots\vee d_{j-1}\vee d_{j+1}\vee\ldots\vee d_k)} \quad (31)$$

where $\rightleftharpoons$ sign stands for "if and only if." Let the right hand side of (31) be denoted by $d_j'$. Now $$e_i^j$$

may be computed in two different ways, one by using $d_j$ and another by using

Let $$d_j'$$

$$e_i^j=d_j \text{ and } z_{(i+j-1)} \quad (32)$$

$$e_i^{j\prime}=d' \text{ and } z_{(k-i+j)}$$

and define $$\tilde{x}_{(j-1)t+i}=Maj\,[\hat{x}_{(j-1)t+i},\ (\hat{x}_{(j-1)t+i}\oplus e_i^j),\ (\hat{x}_{(j-1)t+i}\oplus e_j^{i\prime})] \quad (33)$$

When $$e_i^j=e_i^{j\prime}=1$$

clearly the output is the corrected information bit and when $$e_i^j\neq e_i^{j\prime}$$

the output is $\hat{x}_{(j-1)t+i}$. The output $\tilde{x}$ will now be in error only if $\hat{x}_{(j-1)+i}$ is in error. The condition $$e_i^j\neq e_i^{j\prime}$$

can arise only because of an error in the decoding circuit, or when $Z=0$. Whenever such an error exists, it will cause an output to be in error only if the information bit the network is supposed to correct is also in error. Thus a single error in the decoding circuit will not cause all the outputs from the memory to be in error. In view of the definition of $dj$ for $1\leq j\leq k$, $f_1$ may be redefined as follows:

$$f_1=\bigvee_{j=1}^{k}(d_j\oplus d)_j^i \text{ and } (z_1\vee\ldots\vee z_k) \quad (34)$$

The correction circuit block diagram corresponding to Equation 33 and the discussion thereof immediately following Equation 33 is shown in FIG. 8*b*. In this circuit, gates 70 and 74 are AND gates, gate 72 is an OR gate and gate 71 is a threshold gate with a threshold of 2, that is, its output is a 1 if and only if two or more of its inputs are 1's.

Figure 9:
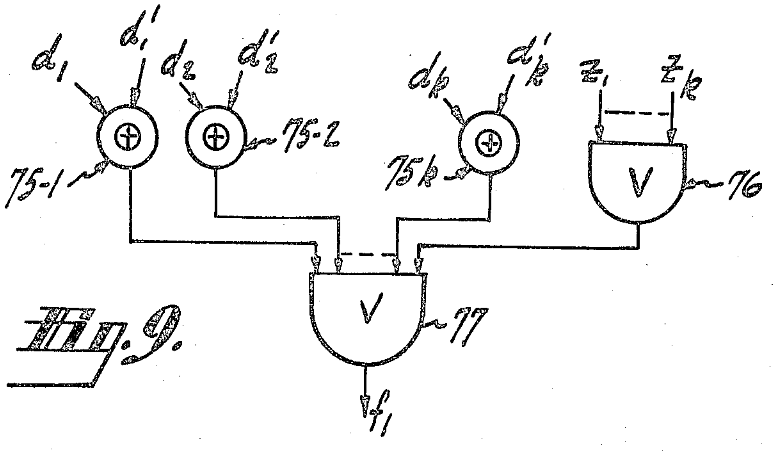
FIG. 9 is a logic diagram of an alternate form of error detection circuit for the bit $f_1$.

The error detection circuit block diagram corresponding to Equation 34 is shown in FIG. 9. It includes $k$ EXCLUSIVE/OR gates 75-1 . . . **75-*k* and OR gates 76 and 77**.

GENERAL COMMENTS

In the foregoing discussion, general rules have been given and their application to the case of $k=7$ and $N-k=14$ has been discussed. As $k$ is increased, the system becomes more economical in the sense that fewer check digits are needed in proportion to the $N-k$ information bits. Expressed another way, the block length may be increased while still requiring only a single parity bit per block. The number of information bits in a block is given by the equation:

$$B=\frac{k-3}{2} \quad (35)$$

The total number of information bits in a code word consisting of $k$ blocks is $$(N-k)=kB=\frac{k(k-3)}{2} \quad (36)$$

The Table V below shows these relationships for a number of values of $k$, where $k$ is the number of columns and rows in the matrix V and is also the number of parity or check bits $a$ which are needed. Note again that $k$ is a prime number. The last term in the table $(N-k)/k$ may be considered the figure of merit of the system.

TABLE V

| $k$ | $(N-k)$ | B | $(N-k)/k$ |
|---|---|---|---|
| 7 | 14 | 2 | 2 |
| 11 | 44 | 4 | 4 |
| 13 | 65 | 5 | 5 |
| 19 | 152 | 8 | 8 |
| 23 | 230 | 10 | 10 |

The code for $k=19$ is of special interest since in this case $B=8$, a common size of a byte in computers.

SPECIAL CASES

If in the design of a memory system (or a communication system) it is reasonably certain that there will be no errors in the check bits ($\hat{a}_1 \ldots \hat{a}_k$) then one more information bit can be accommodated for each check bit. For example, Table II for this case may be:

Table VI Code for $k=7$ in the special case

| | | | | | | |
|---|---|---|---|---|---|---|
| $S_1'=(x_1$ | $x_4$ | $x_8$ | $x_{12}$ | 0 | $x_{18}$ | $x_{20})$ |
| $S_2'=(x_2$ | $x_4$ | $x_7$ | $x_{11}$ | $x_{15}$ | 0 | $x_{21})$ |
| $S_3'=(x_3$ | $x_5$ | $x_7$ | $x_{10}$ | $x_{14}$ | $x_{18}$ | $0\ )$ |
| $S_4'=(0$ | $x_6$ | $x_8$ | $x_{10}$ | $x_{13}$ | $x_{17}$ | $x_{21})$ |
| $S_5'=(x_3$ | 0 | $x_9$ | $x_{11}$ | $x_{13}$ | $x_{16}$ | $x_{20})$ |
| $S_6'=(x_2$ | $x_6$ | 0 | $x_{12}$ | $x_{14}$ | $x_{16}$ | $x_{19})$ |
| $S_7'=(x_1$ | $x_5$ | $x_9$ | 0 | $x_{15}$ | $x_{17}$ | $x_{19})$ |

Code-word: $(x_1x_2x_3a_4\ x_4x_5x_6a_5\ \ldots\ x_{19}x_{20}x_{21}a_3)$ and the each block of the code word contains three information bits instead of two as before. The equation for $d$ in terms of the $g_i$'s for this case is:

$$\overline{d}=(g_1\oplus g_7)\vee(g_2\oplus g_6)\vee(g_3\oplus g_5) \quad (37)$$

The error correction means will have the same form discussed earlier.

The same special case can be used also in cases where it is reasonable to assume that there will never be a single block error wherein all the digits of the block are in error. Thus, to accommodate a byte of 8 information bits per block in the special case a value of $k=17$ is needed instead of 19, as shown in Table V for the general case.

In these special cases, it is possible to detect the presence of any odd number of errors among the check bits. These codes have the property, $$\sum_{i=1}^{k}a_i=0 \quad (38)$$

Figure 10:
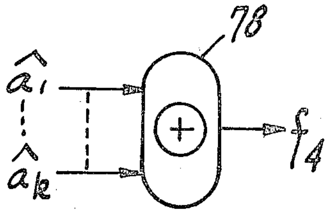
FIG. 10 is a logic diagram of a detection circuit for an odd numbers of errors in check bits $$\hat{a}_1 \ldots \hat{a}_k$$

That is, the check bits by themselves should always have even parity. By testing for this parity one can determine the presence of any odd number of errors in $(a_1 \ldots a_k)$. The circuit for doing this consisting of a single SUM MODULO 2 gate 78 is shown in FIG. 10.

What is claimed is:

1. A system for correcting errors in the transmission of $N-k$ information bits $x_1, x_2 \ldots x_{N-k}$ comprising, in combination:

means for arranging the $(N-k)$ information bits $x_1, x_2 \ldots x_{N-k}$ into $k$ subsets, at least most of which have more than two bits, such that each information bit appears only once in a subset, each information bit is included in two subsets and no two subsets contain the same pair of bits;

means for generating a check bit for each said subset of information bits;

means for transmitting the check bits and information bits as $k$ blocks of bits $B_1, B_2 \ldots B_k$, each block consisting of a group of information bits and a single check bit which is not associated with any information bit in its block;

means receptive of the blocks $\hat{B}_1, \hat{B}_2 \ldots \hat{B}_k$ for generating a syndrome Z which has bits all of the same value when there is no error in the received bits and which in other cases has a distinctive pattern of 0's and 1's whose symmetry is indicative of whether there is one or more errors in only a single block $\hat{B}_i$ of the $k$ blocks $\hat{B}_1, \hat{B}_2 \ldots \hat{B}_k$;

means responsive to the syndrome Z for producing an output D indicative of the type of symmetry exhibited by said syndrome; and means responsive to the output D, to the syndrome Z and to the blocks of bits $\hat{B}_1, \hat{B}_2 \ldots \hat{B}_k$, for producing $(N-k)$ bits $\tilde{x}_1, \tilde{x}_2 \ldots \tilde{x}_{N-k}$ which are of the same value as the corresponding $(N-k)$ transmitted bits $x_1, x_2 \ldots x_{N-k}$, where:

N is an integer $\leqq k(k-1)/2$ and $k$ is a prime number.

2. A system as set forth in claim 1, further including means responsive to the output D and to the syndrome Z for indicating an uncorrectable error in the received blocks $\hat{B}_1, \hat{B}_2 \ldots B_k$.

3. A system as set forth in claim 1, further including means responsive to the output D and to the syndrome Z for indicating a failure in the means for generating the syndrome.

4. A system as set forth in claim 3, further including means responsive to the output D and to the syndrome Z for indicating a failure in the means for producing an output D.

5. A system for correcting errors in the transmission of $(N-k)$ information bits $x_1, x_2 \ldots x_{N-k}$ comprising, in combination:

means for selecting $k$ subsets $S_1 \ldots S_k$ of said information bits, where $S_1 \ldots S_k$ are rows in a matrix having $k$ columns and $k$ rows, the first column $V_1$ of which consists of the information bits $$x_1, x_2 \ldots x_{(k-3)/2}\ 0\ 0\ 0\ x_{(k-3)/2} \ldots x_2, x_1$$

where 0 indicates the absence of a bit, and having $k-1$ additional columns $V_i$, for $2 \leq i \leq k$, obtained by shifting the column $x_{(i-1)t+1}, x_{(i-1)t+2} \ldots x_{it}\ 0\ 0\ 0\ x_{it} \ldots x_{(i-1)t+2}, x_{(i-1)t+1}$ cyclically down through $i-1$ positions, where $i$ is the column number, $t=(k-3)/2$, and $k$ is a prime number which is less than N;

means for generating a parity bit for each subset of information bits;

means for transmitting $k$ blocks of bits $B_1, B_2 \ldots B_k$, each $i^{th}$ block, for $1 \leq i \leq k$, consisting of the information bits $x_{(i-1)t+1}, x_{(i-1)t+2} \ldots x_{it}$ in the $i^{th}$ column of [V] and a single parity bit which is not associated with any information bit in its block;

means receptive of the blocks $\hat{B}_1, \hat{B}_2 \ldots \hat{B}_k$ for generating a syndrome Z which has bits all of the same value when there is no error in the received bits and which has a distinctive pattern of 0's and 1's whose symmetry is indicative of whether there is one or more errors in only a single block $\hat{B}_i$ of the $k$ blocks $\hat{B}_1, \hat{B}_2 \ldots \hat{B}_k$;

means responsive to the syndrome Z for producing an output D consisting of $k$ bits $d_1, d_2 \ldots d_k$ indicative of the type of symmetry exhibited by said syndrome; and means responsive to the output D, to the syndrome Z and to the blocks of bits $\hat{B}_1, \hat{B}_2 \ldots \hat{B}_k$, for producing $(N-k)$ bits $x_1, x_2 \ldots \tilde{x}_{N-k}$ which are of the same value as the corresponding $(N-k)$ transmitted bits $x_1, x_2 \ldots x_{N-k}$.

6. The system set forth in claim 5, wherein the parity bit for the block $B_i$ of the $i^{th}$ column is the parity bit for the subset of the row containing the center 0 of the $i^{th}$ column.

References Cited

OTHER REFERENCES

| | | | |
|---|---|---|---|
| 2,956,124 | 10/1960 | Hagelbarger | 340—146.1X |
| 3,303,333 | 2/1967 | Massey | 235—153 |
| 3,478,313 | 11/1969 | Srinivasan | 340—146.1 |

OTHER REFERENCES

W. W. Peterson, Error-correcting Codes, MIT Press and John Wiley & Sons, Inc., New York, 1961, pp.217–226.

MALCOLM A. MORRISON, Primary Examiner

C. E. ATKINSON, Assistant Examiner

U.S. Cl. X.R.

235—153

UNITED STATES PATENT OFFICE

CERTIFICATE OF CORRECTION

Patent No. 3,562,709 Dated February 9, 1971

Inventor(s) C. V. Srinivasan

It is certified that error appears in the above-identified patent and that said Letters Patent are hereby corrected as shown below:

Column 6, line 11, "$x_{(i-1)t+2} = x_7$" should read

---$x_{(i-1)t+1} = x_7$---

Column 6, line 39, should read ---where '$\{x_i \epsilon S_j\}$' is read

'for all $x_i$ included in $S_j$', and---

Column 7, line 31, "(k+)3" should read ---(k+3)---

Column 8, line 5, "$Y_1 = \hat{S}_i \hat{\cup} a_i$" should read ---$Y_i = \hat{S}_i \cup \hat{a}_i$-

Column 8, line 9, "$\hat{\cup}$" should read ---'$\cup$'---

Column 8, line 71, "$e^1$" should read ---$e_3^1$---

Column 8, line 75, "$e^1 = 1$" should read ---$e_1^1 = 1$---

Column 9, line 30, "$x_3 = x_3$, $\hat{x}_6 = x_6$ and $x_{14} = x_{14}$" should re ---$\hat{x}_3 = x_3$, $\hat{x}_6 = x_6$ and $\hat{x}_{14} = x_{14}$---

Column 9, line 52, "$x_4$" should read ---$\hat{x}_4$---

Column 9, line 54, "$e_1^2 = 1$ and $Z = E^2 = 1100000$" should read

---$e_2^2 = 1$ and $Z = E^2 = 0010001$---

Column 12, line 52, "$x_2$" should read ---$\hat{x}_2$---

UNITED STATES PATENT OFFICE

Page

CERTIFICATE OF CORRECTION

Patent No. 3,562,709 Dated February 9, 1971

Inventor(s) C. V. Srinivasan

It is certified that error appears in the above-identified patent and that said Letters Patent are hereby corrected as shown below:

Column 13, line 25, should read ---$d_j$ and another by using $d'_j$---

Column 13, line 27, delete "$d'_j$"

Column 13, line 30, "d'" should read ---$d'_j$---

Column 13, line 34, "$e^i_j$'" should read ---$e^j_i$'---

Column 13, line 56, "d)$'_j$" should read ---$d'_j$)---

Column 15, line 52, before "having" insert ---[V]---

Column 16, line 30, "$x_1$, $x_2$" should read ---$\tilde{x}_1$, $\tilde{x}_2$---

Signed and sealed this 12th day of October, 1971.

(SEAL)
Attest:

EDWARD M.FLETCHER,JR.
Attesting Officer

ROBERT GOTTSCHALK
Acting Commissioner of Patents